US009727372B2

(12) United States Patent
Jensen et al.

(10) Patent No.: US 9,727,372 B2
(45) Date of Patent: Aug. 8, 2017

(54) SCHEDULING COMPUTER JOBS FOR EXECUTION

(71) Applicant: Invisitasking LLC, Clearwater, FL (US)

(72) Inventors: Craig Jensen, La Canada, CA (US); Andrew Staffer, Sylmar, CA (US); Basil Thomas, Sylmar, CA (US)

(73) Assignee: Invisitasking LLC, Clearwater, FL (US)

(*) Notice: Subject to any disclaimer, the term of this patent is extended or adjusted under 35 U.S.C. 154(b) by 0 days.

(21) Appl. No.: 15/201,592

(22) Filed: Jul. 4, 2016

(65) Prior Publication Data

US 2016/0314015 A1      Oct. 27, 2016

Related U.S. Application Data

(63) Continuation of application No. 13/569,018, filed on Aug. 7, 2012, now Pat. No. 9,384,040, which is a continuation of application No. 11/471,466, filed on Jun. 19, 2006, now Pat. No. 8,239,869.

(51) Int. Cl.
*G06F 9/46* (2006.01)
*G06F 9/48* (2006.01)
*G06F 9/50* (2006.01)

(52) U.S. Cl.
CPC .......... *G06F 9/4843* (2013.01); *G06F 9/505* (2013.01); *G06F 2209/482* (2013.01); *G06F 2209/5017* (2013.01); *G06F 2209/5018* (2013.01)

(58) Field of Classification Search
None
See application file for complete search history.

(56) References Cited

U.S. PATENT DOCUMENTS

| 5,675,790 A | 10/1997 | Walls |
| 5,881,284 A | 3/1999 | Kubo |
| 5,974,439 A | 10/1999 | Bollella |

(Continued)

FOREIGN PATENT DOCUMENTS

| EP | 0880139 A2 | 11/1998 |
| JP | 06-237348 A | 8/1994 |

(Continued)

OTHER PUBLICATIONS

Ferreto et al., "Scheduling Divisible Workloads Using the Adaptive Time Factoring Algorithm", Proceedings of 6th International Conference on Algorithms and Architectures for Parallel Processing, ICA3PP, Melbourne, Australia, Oct. 2-3, 2005, pp. 232-239.
Gerber et al., "Slicing Real-Time Programs for Enhanced Schedulability", Proceedings of IEEE Real-Time System Symposium, 1997, 31 pages.
Albus, J. S., "Task Decomposition", Proceedings of the 1993 International Symposium on Intelligent Control, 1993, pp. 49-51.
Das et al., "Towards Commercialization of Utility-based Resource Allocation", IEEE, 2006, pp. 287-290.

(Continued)

*Primary Examiner* — Tammy Lee
(74) *Attorney, Agent, or Firm* — Invoke

(57) ABSTRACT

A method, system, and apparatus to divide a computing job into micro-jobs and allocate the execution of the micro-jobs to times when needed resources comply with one or more idleness criteria is provided. The micro-jobs are executed on an ongoing basis, but only when the resources needed by the micro-jobs are not needed by other jobs. A software program utilizing this methodology may be run at all times while the computer is powered up without impacting the performance of other software programs running on the same computer system.

18 Claims, 5 Drawing Sheets

(56) References Cited

U.S. PATENT DOCUMENTS

| | | | |
|---|---|---|---|
| 6,016,503 | A | 1/2000 | Overby, Jr. et al. |
| 6,226,728 | B1 | 5/2001 | See et al. |
| 6,260,058 | B1 | 7/2001 | Hoenninger et al. |
| 6,330,583 | B1 | 12/2001 | Reiffin |
| 6,591,287 | B1 | 7/2003 | More et al. |
| 7,007,090 | B1 | 2/2006 | Spangler et al. |
| 7,076,781 | B2 | 7/2006 | Skovira |
| 7,237,016 | B1 * | 6/2007 | Schober .................. G06F 15/02 709/223 |
| 7,370,328 | B2 | 5/2008 | Yamada et al. |
| 7,451,704 | B1 | 11/2008 | Gold et al. |
| 7,480,840 | B2 | 1/2009 | Hathorn et al. |
| 7,814,485 | B2 | 10/2010 | Morgan et al. |
| 7,853,948 | B2 | 12/2010 | Berstis et al. |
| 7,987,466 | B2 | 7/2011 | Nagamatsu et al. |
| 2001/0010065 | A1 | 7/2001 | Chiba |
| 2001/0032293 | A1 | 10/2001 | Korst et al. |
| 2003/0120778 | A1 | 6/2003 | Chaboud et al. |
| 2003/0231630 | A1 | 12/2003 | Messenger |
| 2004/0030882 | A1 | 2/2004 | Forman |
| 2004/0187131 | A1 | 9/2004 | Dageville et al. |
| 2005/0060237 | A1 | 3/2005 | Barsness et al. |
| 2005/0071841 | A1 | 3/2005 | Hoflehner et al. |
| 2005/0073508 | A1 | 4/2005 | Pittel et al. |
| 2005/0114857 | A1 * | 5/2005 | Chen ....................... G06F 9/524 718/100 |
| 2005/0125793 | A1 | 6/2005 | Aguilar et al. |
| 2005/0149932 | A1 | 7/2005 | Hasink et al. |
| 2005/0240933 | A1 | 10/2005 | Barsness et al. |
| 2005/0240934 | A1 | 10/2005 | Patterson et al. |
| 2005/0246461 | A1 | 11/2005 | Accapadi et al. |
| 2005/0268299 | A1 | 12/2005 | Picinich et al. |
| 2006/0150190 | A1 | 7/2006 | Gusler et al. |
| 2006/0277550 | A1 | 12/2006 | Williams et al. |
| 2007/0094002 | A1 | 4/2007 | Berstis et al. |
| 2007/0143759 | A1 | 6/2007 | Ozgur et al. |
| 2007/0150871 | A1 | 6/2007 | Barsness et al. |
| 2008/0005524 | A1 | 1/2008 | Worrall |
| 2008/0086733 | A1 | 4/2008 | Jensen et al. |
| 2008/0086734 | A1 | 4/2008 | Jensen et al. |
| 2012/0054769 | A1 | 3/2012 | Jensen et al. |

FOREIGN PATENT DOCUMENTS

| | | |
|---|---|---|
| JP | 2004-302986 A | 10/2004 |
| JP | 2005-011023 A | 1/2005 |
| JP | 2006-126973 A | 5/2006 |
| RU | 2018945 C1 | 8/1994 |
| RU | 849893 A1 | 1/1996 |
| RU | 2233470 C2 | 7/2004 |
| WO | 00/70455 A2 | 11/2000 |

OTHER PUBLICATIONS

Kuhn et al., "Task Decomposition in Dynamic Agent Societies", IEEE, 1993, pp. 165-171.

Lifka, David A., "The ANL/IBM SP Scheduling System", Argonne National Laboratory, 1995, 9 pages.

Feitelson et al., "Parallel Job Scheduling—A Status Report", Job Scheduling Strategies for Parallel Processing, 10th International Workshop, JSSPP 2004, 2005, pp. 1-16.

Uttamchandani et al., "CHAMELEON: A Self-Evolving, Fully-Adaptive Resource Arbitrator for Storage Systems", USENIX Annual Technical Conference, General Track, 2005, pp. 75-88.

Fleege et al., "Throttling Activity in a Multi-Tasking Operating System", Motorola, Inc. Technical Developments, Dec. 1, 1997, www.ip.com Prior Art Database, Electronic Publication Jun. 13, 2002, pp. 72-74.

Parekh et al., "Throttling Utilities in the IBM DB2 Universal Database Server", Proceeding of the 2004 American Control Conference Boston, Massachusetts, Jun. 30-Jul. 2, 2004, pp. 1986-1991.

Polychronopoulos et al., "Kernel-Level Scheduling for the Nano-Threads Programming Model", High Performance Computing Architecture Laboratory, Department of Computing Engineering and Informatics, University of Patras, Greece and European Center for Parallelism of Barcelona, Department d'Arquitectura de Computadors, Universitat Politecnica de Catalunya, Spain, 1998, pp. 337-344.

Hadjidoukas et al., "A Portable Kernel-Mode Resource Manager on Windows 2000 Platforms", High Performance Information Systems Laboratory, Department of Computing Engineering and Informatics, University of Patras, Greece, 7 pages.

Barekas et al., "An OpenMP Implementation for Multiprogrammed SMPs", High Performance Information Systems Laboratory, Department of Computing Engineering and Informatics, University of Patras, Greece, Feb. 2002, 9 pages.

Ramamritham et al., "Distributed Scheduling of Task with Deadlines and Resource Requirements", IEEE Transactions on Computers, 1989, pp. 1110-1123.

Regehr, John, "Ph.D. Proposal: Hierarchical Loadable Schedulers", Apr. 27, 1999, 10 pages.

Engler et al., "Exokernel: An Operating System Architecture for Application-Level Resource Management", M.I.T. Laboratory for Computer Science Cambridge, Mar. 24, 1995, pp. 1-16.

Moreira et al., "Dynamic Resource Management on Distributed Systems using Reconfigurable Applications", IBM Journal of Research and Development, vol. 41, Issue 3, May 1997, pp. 303-330.

Barham, Paul Ronald, "Devices in a Multi-Service Operating System", Churchill College, University of Cambridge, Ph.D. Dissertation, Jul. 1996, 142 pages.

\* cited by examiner

SCHEDULING COMPUTER JOBS FOR EXECUTION

CROSS-REFERENCE TO RELATED APPLICATIONS; BENEFIT CLAIM

This application claims the benefit as a Continuation of U.S. application Ser. No. 13/569,018 filed on Aug. 7, 2012 which is a of Continuation of U.S. patent application Ser. No. 11/471,466, filed Jun. 19, 2006 the entire contents of both of which are hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

This application is related to U.S. patent application Ser. No. 13/287,885, filed on Nov. 2, 2011, the entire contents of which are hereby incorporated by reference as if fully set forth herein.

FIELD OF THE INVENTION

The present invention relates to executing software applications in a computing environment. In particular, embodiments of the present invention relate to dividing a computing or input-output job of an application into micro-jobs and allocating the execution of the micro-jobs to periods of low computer resource utilization, so that execution of the micro-jobs does not significantly impact performance of other applications and jobs.

BACKGROUND

In the early days of mainframe computers, the concept of running software programs in batches of jobs was the norm. There were a limited number of computers, so users had to schedule their job(s) to run on the computer when the computer was not being used for some other, more important job. In such systems, each job was scheduled to run to completion without interruption, followed by the next job and then the next. The limited computer time available necessitated running lower-priority jobs "off-hours" so as not to delay higher-priority applications.

More recently, multi-tasking computer systems have allowed the concurrent or interleaved execution of two or more jobs by a single CPU. A multi-tasking computer system allows many applications to execute in the same general time period. Typically, multi-tasking systems have complex internal scheduling algorithms, wherein processes are scheduled in accordance with assigned priorities. However, the applications still contend for computing resources. To alleviate resource contention, an application in a multi-tasking system may be run off "off-hours" on an operator-scheduled basis.

The applications that are run off-hours may include maintenance jobs, such as backup, indexing, software updates, virus and malware scans and defragmentation. Candidates for off-hours processing may also include software applications that run reports, perform financial calculations, etc. However, some applications, such as indexers, should be run during production time. Therefore, not all applications are good candidates for off-hours execution.

Another problem with scheduling a job to run off-hours is that the computer may be turned off at the time the job is scheduled to run. A further problem is that some machines do not have clearly identified off-hours. For example, many computer systems are used twenty-four hours a day for a computing activity that is considered significant enough that the activity should not be interrupted for a substantial period. Therefore, there are no "off-hours" in which to schedule jobs. A still further problem is that typically a user has to determine when the job should be scheduled for off-hours computing. Thus, setting the schedule takes up a user's time and is subject to user error.

As previously mentioned, running the computing job can interfere with a user's ability to use the computer and can take resources away from other, possibly more pressing applications and jobs. Throttling is a technique for minimizing these negative impacts. Throttling prevents an application or job from using more than an allocated amount of resources. Types of throttling include disk I/O throttling, CPU throttling and network throttling. For example, CPU throttling can involve establishing a target CPU utilization limit for an application and forcing the application to stop working if the application exceeds the target limit. Throttling is sometimes applied to computer resources for maintenance applications or less important computing jobs. While throttling has benefits, the computing job's resource use is not totally transparent to other jobs and applications.

At the same time, it is observable that considerable computing resources go unused, even during the processing of urgent, top-priority jobs. The wide differences in the speeds of CPUs, memory, disk drives and networks typically cause one or more of these components to sit idle while one of the other components is fully consumed. A three-gigahertz CPU, for example, often sits idle while waiting for a disk drive to retrieve data at an average access time measured in milliseconds.

To recover and utilize these otherwise lost resources, what is needed is a technique that allows one or more jobs to execute in a computer system without significantly impacting other jobs or applications. The technique should not consume a user's time in scheduling the job nor should it negatively impact the user's interaction with the computer system when the job is running. The technique should not require scheduling the job to run off-hours. The technique should be utilizable by and beneficial to a computer system that has no off-hours.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
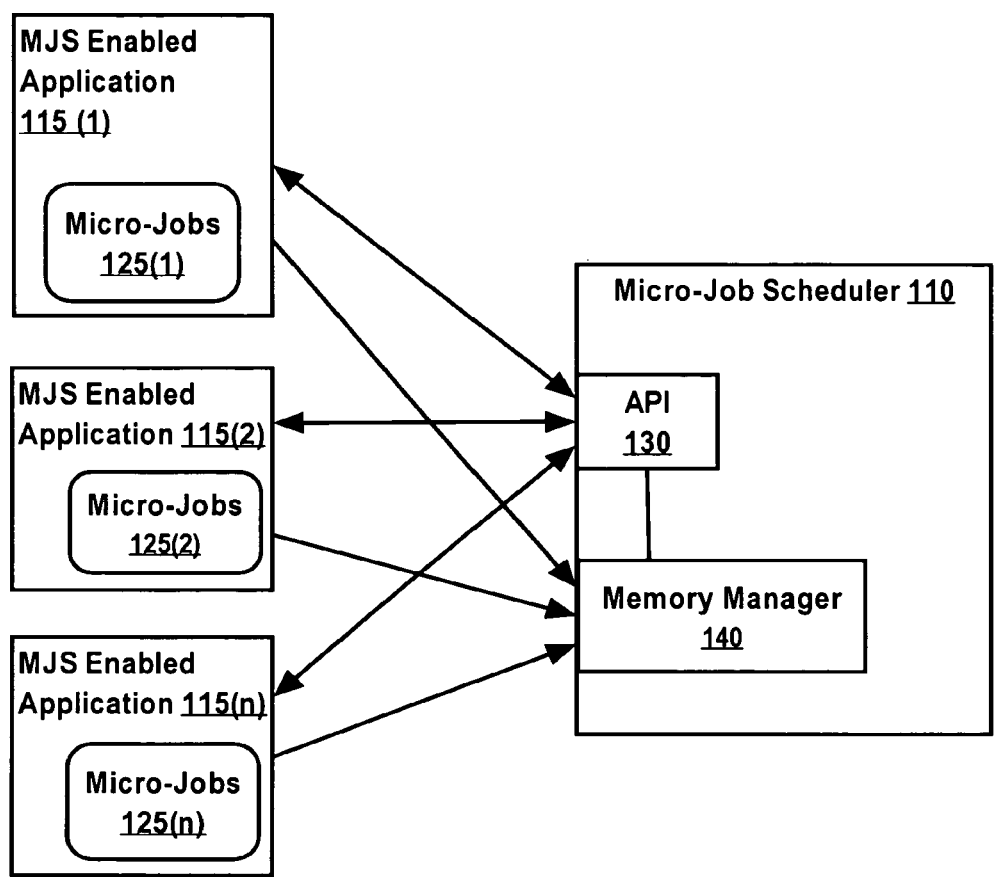
FIG. 1 is a diagram of an architecture for executing micro-jobs, in accordance with an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

The majority of computers do not utilize all of their resource capacity 100% of the time. This is typically true even of computers that seemingly are in high use twenty-four hours a day, seven days a week, as well as computers that are only turned on for a portion of each day. Therefore, computer time and resources are wasted. For example, over a twenty-four hour period, a computer system that is used quite heavily, and which may have brief spikes in activity, may on average use only about five to twenty percent of its resources.

A method, system, and apparatus are disclosed herein to utilize these unused computer resources by dividing a computing job into micro-jobs and executing the micro-jobs when the required resources to run the micro-job are idle. As used herein, the term micro-job is a portion of a computer process the execution of which can be delayed without affecting the outcome of the rest of the process. As used herein, the term "idle resource" "idle-time" or the like refers to a time when a resource is less than 100% utilized, that is, a portion of the resource that is not being utilized is considered to be "idle" even though some other portion of the resource is being utilized.

Thus, the micro-jobs are executed on an ongoing basis, but without an attempt to get the computing job to complete as rapidly as possible. A software program utilizing this methodology may be run at all times while the computer is powered up with negligible impact on the performance of other software programs running at the same time on the same computer, effectively resulting in considerably more useful work getting done per unit of time.

In contrast to attempting to run the job as quickly as possible given current resource constraints or to scheduling the job to run "off-hours" to avoid significantly impacting other jobs and applications, the job is run on the computer on an ongoing basis, but in such minute pieces that it may be imperceptible to the user or other computer jobs. Thus, the job may be completely transparent to the user and to other jobs and applications. The user does not need to schedule the job; with this method it can be run at any time, including during performance-critical times.

As used throughout this description, the term "transparent" with respect to other jobs, processes, and applications means that other jobs and applications are able to execute without suffering any significant negative performance impact due to execution of the micro-jobs. A negative impact can be determined by comparing how long a test job takes to run by itself and while a computing job that is divided into micro-jobs is executing. There should be no significant difference in the run time of the test job for these two cases.

A micro-job scheduler (MJS) determines when the micro-jobs should be executed, in accordance with an embodiment of the present invention. The application program divides its computing jobs into a plurality of micro-jobs, in one embodiment. As used herein, the term plurality means any number greater than one. The MJS determines when the micro-jobs should execute. Applications that are enabled to work with the MJS are referred to herein as MJS-enabled applications.

In one embodiment, the MJS has a memory manager. An MJS-enabled application requests memory from the MJS memory manager, as opposed to requesting memory from the operating system. In one embodiment, the MJS-enabled application has a very small in-memory footprint (meaning the amount of memory allocated to the MJS-enabled application and from which the MJS-enabled application executes). In order to achieve the small footprint, limits are placed on the amount of memory a program using MJS utilizes.

In another embodiment, computer resource utilization is monitored and analyzed to determine whether resource utilization complies with one or more idleness criteria. The MJS causes micro-jobs to be executed when the one or more idleness criteria are satisfied. Since the time required for a particular micro-job to execute is smaller than the typical window of idle time for the resource used by the particular micro-job, the resource is relinquished before the resource is needed by another job. Thus, resource utilization by the micro-job may go unnoticed and the micro-job may be invisible to its application's environment.

An MJS-enabled application sends resource utilization threshold parameters to the MJS in order to define conditions under which its resource utilization should be yielded, in accordance with an embodiment of the present invention. These resources include, but are not limited to, disk I/O, CPU and network utilization. For example the MJS-enabled application can request a micro-job to be executed pending minimum threshold levels for any combination of the above three resources.

In one embodiment, the application is a storage medium defragmenter. A defragmenter might take 12 minutes of wall clock time to complete a daily scheduled defragmentation job. The MJS-enabled defragmenter divides the defragmentation job into many micro-jobs, which can be executed a few milliseconds at a time, selecting times when the resources needed by the defragmenter are not being used by any other job or application. The MJS-enabled defragmenter can run whenever the computer system is on, dividing the 12-minute job into micro-jobs that execute over a longer period.

As a particular example, the MJS-enabled defragmenter might execute a first micro-job to determine whether a file is fragmented or not. Execution of the first micro-job consumes only otherwise idle resources. That is, resources whose utilization complies with one or more idleness criteria. As a result, execution of the micro-job is transparent to other applications. Moreover, memory utilization is kept low and memory allocation associated with the defragmenter need not be changed prior to or following execution of the micro-job.

Prior to executing each micro-job, the MJS-enabled defragmenter makes a determination whether computer resource utilization complies with one or more idleness criteria. Thus, the MJS-enabled defragmenter determined whether computer resource utilization is currently sufficiently low to allow the micro-job to proceed. If resource utilization is too high, execution of the micro-job is deferred. After the first micro-job executes, the MJS-enabled defragmenter does not necessarily immediately execute a second micro-job. Rather, the execution of subsequent micro-jobs may spread out over time if other applications require the same resources.

Architecture Overview

FIG. 1 is a diagram of an architecture 100 for executing micro-jobs, in accordance with an embodiment of the present invention. Each MJS-enabled application 115(1)-115(n) divides its computing job (or jobs) into micro-jobs 125 to execute. For example, an application programmer can place calls at appropriate locations in the application code that request permission from the MJS 110 to execute a micro-job 125, which, in effect, divides the computing job into micro-jobs 125. The micro-computing jobs are substantially smaller (for example, the smallest) work units that can be completed as a single unit while safely allowing for a pause in execution until the next micro-job 125 executes, in accordance with one embodiment. By safely allowing for a pause in execution, it is meant that the execution of a particular micro-job can be delayed without affecting the outcome which results from execution of the all of the micro-jobs. Keeping the micro-jobs 125 small allows the MJS-enabled application 115 to use only a small amount of computer resources at one time. Thus, execution of a micro-job 125 consumes a sufficiently small amount of resources so as to not significantly impact performance of other applications in the computer system, in accordance with one embodiment of the present invention. As examples, the MJS-enabled applications 115(1)-115(n) may perform maintenance such as backup, indexing, software updates, virus and malware scans, and defragmentation. However, the MJS-enabled applications 115(1)-115(n) may also be software other than maintenance.

The micro-job scheduler (MJS) 110 determines when micro-jobs 125 can be executed. In this embodiment, the MJS 110 has an application program interface (API) 130 to allow a particular MJS-enabled application (e.g., 115(1)) to request that one or more micro-jobs 125 be allowed to execute. The API 130 also allows an MJS-enabled application 115 to specify by how much the micro-jobs 125 may be spread out, as will be discussed more fully below. An example API is included herein below. However, the architecture 100 is not limited to the example API.

The micro-job scheduler 110 maintains a micro-job queue, such that the MJS 110 can determine which micro-job 125 should be allowed to execute next. The execution of micro-jobs is timed by the MJS 110 so as to have negligible impact on other applications. In one embodiment, the MJS 110 schedules micro-jobs such that the micro-jobs utilize only idle resources. The MJS 110 determines whether resource utilization complies with one or more idleness criteria to make a scheduling decisions. In other words, the MJS 110 is resource based, in this embodiment. The execution of the microjobs can be specified by the MJS-enabled application in an API call or other method of communication between the application and the MJS. When the scheduler 105 determines that the next micro-job 125 may execute without impacting other jobs, the MJS 110 responds to the MJS-enabled application 115 by instructing the MJS-enabled application 115(1) to execute the micro-job 125. The MJS bases its determination on when to schedule jobs based on resource utilization, in one embodiment. As an example, the MJS may analyze disk activity. If an application other than the application with the micro-job is using the disk, then the MJS waits until the other application is done to schedule the micro-job. The MJS continues to monitor the disk I/O utilization, and allows another micro-job to be scheduled if no other application is seeking access to disk I/O. However, if another application seeks utilization of disk I/O, then the MJS will not allow another micro-job to be scheduled, wherein the other application can utilize the disk I/O.

As another example, the MJS may analyze network activity. If network traffic is too high, the MJS will not schedule any micro-jobs until traffic slows. If network traffic is low enough, then the MJS schedules a micro job for execution. The MJS continues to check to make sure that network traffic stays low enough. If network traffic stays low enough, another micro-job may be scheduled. However, if traffic gets too high, no further micro-jobs are scheduled to execute.

The MJS may make resource-based scheduling decisions based on any type of computing resource and any combination of resources. In one embodiment, the MJS has multiple queues of micro-jobs awaiting permission to execute. Each queue may correspond to a particular resource. For example, there may be a queue for micro-jobs that need to utilize disk I/O, a queue for micro-jobs that need to utilize a network, a queue for micro-jobs that need to utilize a CPU, etc. There may also be one or more queues for micro-jobs that utilize a combination of resources. The MJS deploys micro-jobs when the particular resource or combination of resources is available. A particular micro-job might require the use of two resources. For example, the particular micro-job might require use of a network resource and disk resource. However, the particular micro-job does not need CPU resource. Even if the CPU resource utilization is currently high, the particular micro-job can still be scheduled and executed.

While the MJS 110 is depicted in FIG. 1 as a separate program from the MJS-enabled application 115, the MJS 110 may be integrated into the MJS-enabled application 115. Thus, the MJS 110 can cause the micro-jobs 125 to execute without sending a response to the MJS-enabled application 115(1), in accordance with one embodiment. Therefore, the API 130 is optional.

In one embodiment, the MJS 110 is part of an operating system. In another embodiment, the MJS 100 executes outside from an operating system. If the MJS executes outside of the operating system, the MJS self-limits in its own resource utilization, in one embodiment. For example, the MJS 110 monitors its own resource utilization and if its own resource utilization gets too high, the MJS 110 makes a request to the operating system to stop scheduling the MJS 110 for a period of time.

The MJS-enabled application 115 sends parameters to the MJS 110 to control resource utilization, in accordance with an embodiment of the present invention. Control of resource utilization includes, but is not limited to, disk I/O, CPU and network. For example, the MJS-enabled application 115 can request a micro-job be executed pending any combination of threshold levels of the above three resources. Moreover, the MJS-enabled application 115 can specify different resource threshold levels for different micro-jobs 125. For example, the MJS-enabled application 115 specifies different resource threshold level with each micro-job 125, in accordance with one embodiment. Therefore, fine-grained resource management is possible. When the MJS 110 calculates resource utilization, it is the resource utilization of processes other than the MJS-enabled application that is measured, in accordance with one embodiment of the present invention. The following example in which the CPU utilization threshold is set to 20 percent is used to illustrate. If CPU utilization is below 20 percent prior to allowing the MJS-enabled application to execute, CPU utilization may increase to over 20 percent when the micro-job(s) execute. This increase beyond 20 percent is not considered a CPU resource utilization violation, in this example. Similar principles apply to network and disk I/O resources.

The MJS 110 also has a memory manager 140, in one embodiment. When the MJS 110 initializes, it is allocated memory by the operating system, some of which it uses for its own purposes and some of which it allocates to the MJS-enabled applications 115. When an MJS-enabled application 115(1) launches, it requests a memory allocation from the MJS 110. The MJS 110 may determine how much memory to allocate to the MJS-enabled application 115(1) based on factors such as current computer system memory utilization by all processes and the needs of the MJS-enabled application 115(1). Memory requirements may be specific to each MJS-enabled application 115 and may be programmed into the MJS-enabled application 115 by a computer software programmer.

Figure 2:
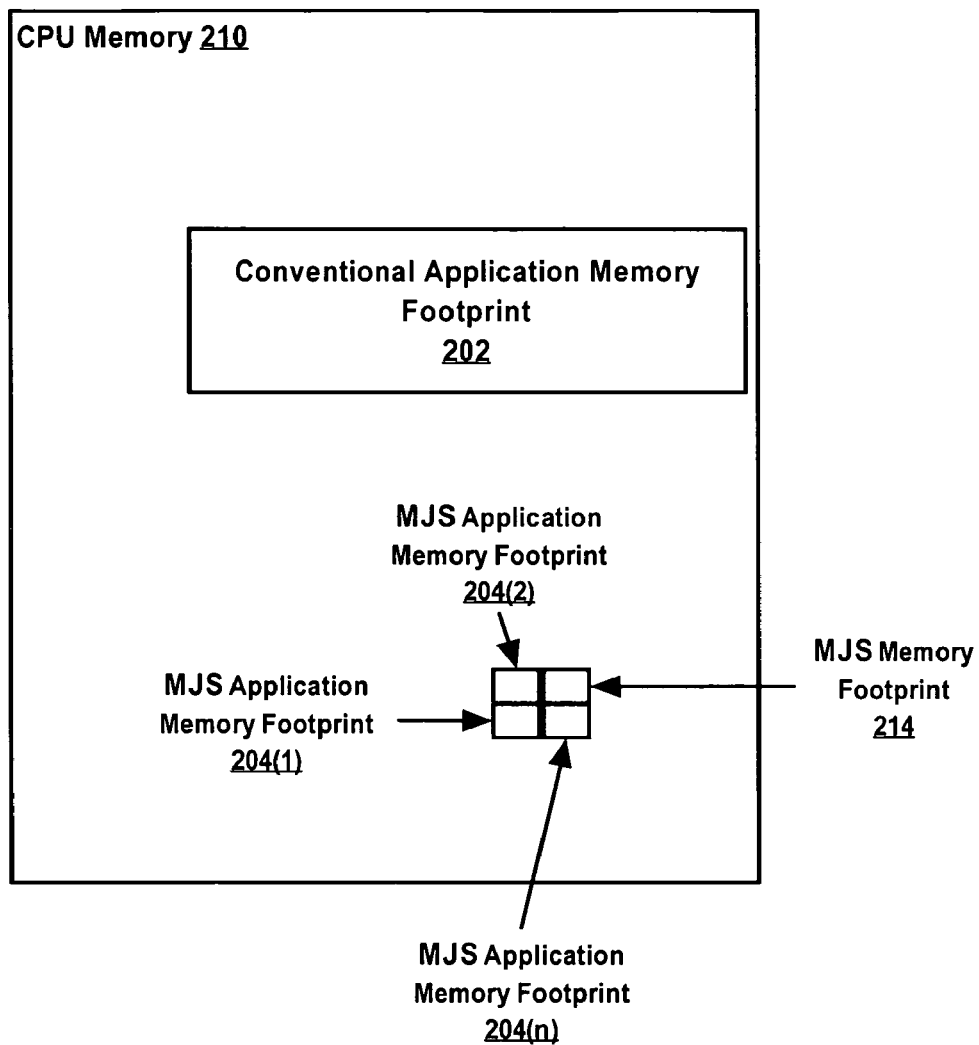
FIG. 2 illustrates a comparison of a conventional application memory footprint compared to an application memory footprint in accordance with an embodiment of the present invention.

FIG. 2 illustrates a comparison of a conventional application memory footprint 202 compared to an MJS-enabled application memory footprint 204(1)-204(n), in accordance with an embodiment of the present invention. Because the MJS-enabled application 115(1) executes micro-jobs 125, the memory allocation 204(1) can be very small. Moreover, because the memory allocation 204(1) is so small, it may not be necessary for the MJS-enabled application 115(1) to ever relinquish its allocated memory 204(1). Thus, the MJS-enabled applications 115 do not cause frequent memory allocations and de-allocations. This reduction in or elimination of memory allocations is one reason why the MJS-enabled applications 115 have no significant impact on other applications and jobs.

Process Flow

Figure 3:
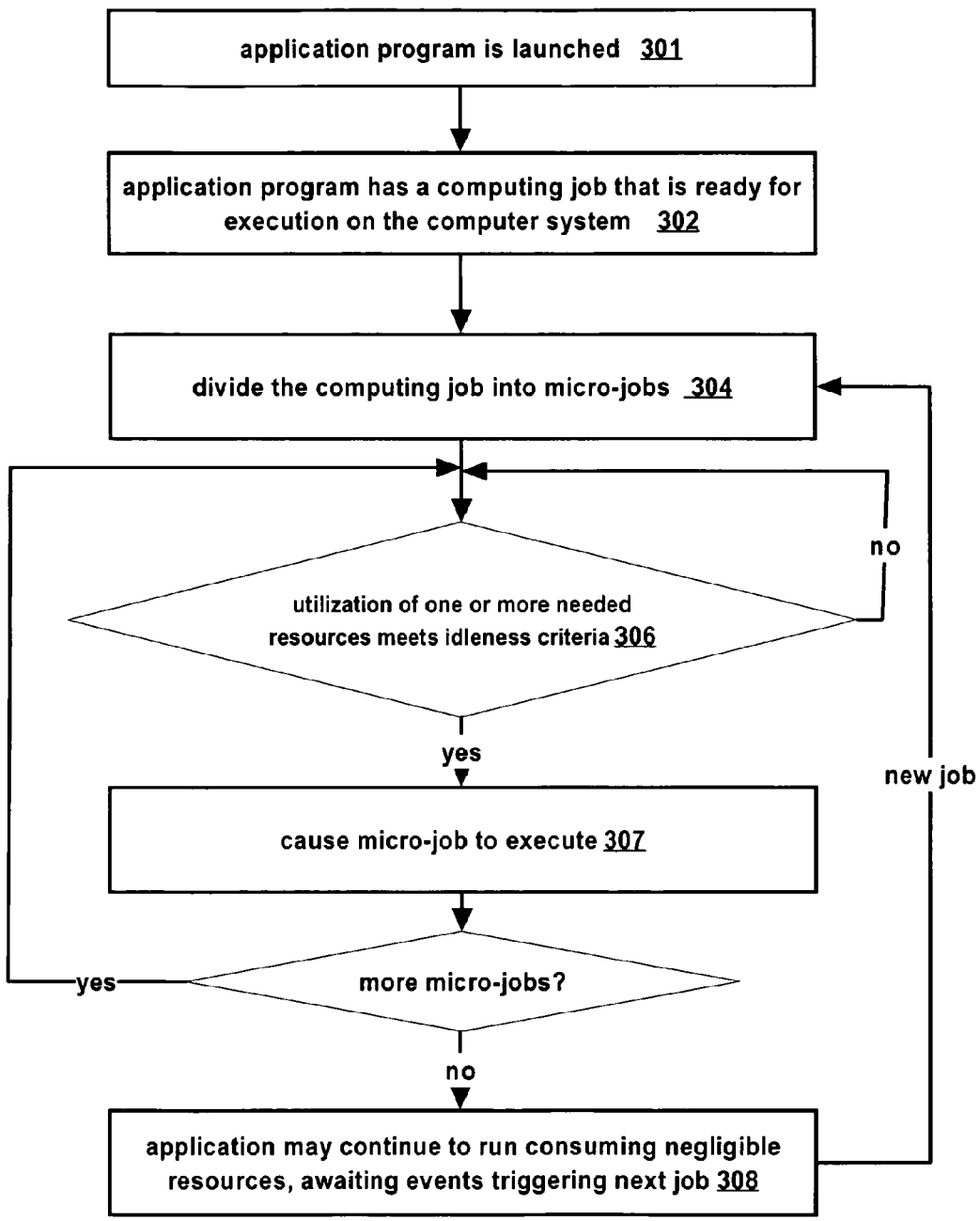
FIG. 3 is a flowchart illustrating steps of a process of executing a micro-job scheduler enabled application using micro-jobs, in accordance with an embodiment of the present invention.

FIG. 3 is a flowchart illustrating steps of a process 300 for executing an MJS-enabled application using micro-jobs, in accordance with an embodiment of the present invention. In step 301, an MJS-enabled application program is launched. The MJS-enabled application program is launched when the computer system is booted, in one embodiment. If the MJS-enabled application does not have a job to perform, the MJS-enabled application sits in an idle state until it has a job to run. In this idle state, the MJS-enabled application may perform some functions such as occasional monitoring. In step 302, the MJS-enabled application has a job to perform, such as defragmenting a storage medium, or scanning for viruses. The job could be to defragment a single disk and the files stored on it, wherein the MJS-enabled application defragments that disk on an ongoing basis.

A small amount of memory is allocated to the MJS-enabled application when it is launched. The amount that is allocated can be very small because the MJS-enabled application typically only attempts to execute a single micro-job at one time. However, in some cases, the MJS-enabled application might attempt to execute multiple micro-jobs without waiting for other processes to execute. For example, if the MJS determines that the required computer system resources are idle, the MJS may allow the MJS-enabled application to execute multiple micro-jobs in a row without another process utilizing the resources that are utilized by the micro-jobs.

In step 304, the computing job is divided into micro-jobs. The micro-jobs are of a size such that execution of the micro-jobs utilizes a sufficiently small amount of resources so as to not significantly impact performance of other jobs in the computer system, in accordance with an embodiment of the present invention. Dividing the computing job into micro-jobs may be accomplished by instructions within an MJS-enabled application. In general, these instructions are decision points in the MJS-enabled application. For example, the instructions can be API calls to the MJS that request permission to execute a micro-job. However, the MJS can be integrated with the MJS-enabled application, in which case the instructions could be calls to a scheduling function within the MJS-enabled application. Other techniques might be used to divide the computing job into micro-jobs.

In step 306, a determination is made, for each of the micro-jobs, as to whether utilization of one or more resources of the computer system to be used by the particular micro-job satisfies one or more idleness criteria. Thus, the micro-jobs are only executed at times when the resources of the computer system needed by the micro-jobs are sufficiently idle. The idleness criteria is based on resource thresholds, in one embodiment. For example, resource thresholds may be used, wherein a micro-job of the MJS-enabled application only executes if resource utilization by other processes is below a threshold specified by the MJS-enabled application. The example API described below contains one example of some resource threshold parameters. However, process 300 is not limited to these resource threshold parameters. Step 306 spreads the execution of micro-jobs over time subject to availability of the resources needed by each micro-job. Therefore, execution of the micro-jobs does not significantly impact performance of the other jobs and applications in the computer system.

The idleness criteria for a particular resource may be based on one or more factors. For example, CPU utilization is used as an idleness criteria for CPU resource utilization, in one embodiment.

In step 307, the micro-jobs are caused to be executed. In one embodiment, the MJS gives permission to the MJS-enabled application that a particular micro job can be executed. If there are more micro-jobs to execute, then control passes to step 306 to determine whether utilization of one or more resources of the computer system to be used by the next micro-job satisfies one or more idleness criteria.

In a maintenance-type embodiment, the MJS-enabled application runs on an on-going basis, continuing to run as long as the computer system remains booted. Thus, even if the MJS-enabled application completes its job, it continues to run, as indicated in step 308. Thus, the MJS-enabled application does not consume additional resources that are typical of launching an application. When the MJS-enabled application determines that it has another job to do, the MJS-enabled application divides the new computing job into micro-jobs in step 304, and the micro-jobs are executed over time in step 306.

Example API

An embodiment of the present invention is an API for allowing an MJS-enabled application to interface with an MJS. The example API has the following resource threshold parameters for CPU, disk, and network.

CPU Utilization threshold
Pending Disk I/O Count threshold
Network Utilization threshold The above parameters can be specified for each micro-job. In other words, different micro-jobs can be assigned different resource threshold parameters. For example, for a micro-job that uses the network, a network threshold may be used. However, the network threshold could be zero for micro-jobs that do not use the network. Thus, fine-grained resource management is provided for, in accordance with an embodiment of the present invention.

As a particular example, the MJS-enabled application can request that a particular micro-job be executed only if the CPU utilization is below 50%, and the I/O Disk Utilization is below 40%, and network traffic is below 60%. Any combination of the resource threshold factors can be used, including none at all. The CPU utilization threshold differentiates between MJS's use of the CPU as opposed to that of any other job, in accordance with an embodiment of the present invention.

The following two parameters are used to specify how frequently resource utilization should be measured.
CPU Utilization Window
Network Utilization Window The CPU Utilization Window parameter defines a time window over which CPU utilization is calculated. For example, CPU utilization over the last n milliseconds is averaged. The network utilization window defines a time window over which network utilization is calculated. These parameters may be internal to the MJS. However, an MJS-enabled application may override these parameters. The pending disk I/O is absolute at any point in time and thus it does not have to be calculated.

A mandatory idle time parameter may be passed from the MJS-enabled application to the MJS engine to control how the micro-jobs are spread out over time. The mandatory idle time parameter is optional. Furthermore, when used, the mandatory idle parameter may have a value of zero.
Mandatory Idle Time The MJS keeps track of "idle time," which is defined as system idle time after all micro-jobs have executed. As previously mentioned, MJS-enabled application(s) can queue up micro-jobs with the MJS. When there are no micro-jobs on the MJS queue, the MJS waits for the specified Mandatory Idle Time and then wakes up and authorizes the MJS-enabled application(s) to perform additional work. For example, an MJS-enabled defragmenter might first execute a number of micro-jobs to defragment a disk drive, then be paused by the MJS micro-job scheduler. After the specified Mandatory Idle Time, the MJS calls the MJS-enabled defragmenter to authorize additional work. For example, the MJS-enabled defragmenter might execute a clean-up job, such as releasing memory. Mandatory Idle Time can be a default parameter that can be adjusted by an MJS-enabled application.

The following parameters relate to waiting to execute a micro-job when resource utilization is above a threshold.
Wait Time
Maximum Wait Time If the MJS determines that resource utilization is currently too high to execute a micro-job, the MJS waits for the specified Wait Time and then re-checks resource utilization. The Wait Time parameter can be increased each time the MJS determines that resource utilization is too high. For example, the MJS can increase the Wait Time parameter until the Max Wait Time is reached. These parameters can be specified by the MJS-enabled application when it is first started. An MJS-enabled application can adjust these parameters during its run time.

Defragmenter Embodiment

Figure 4:
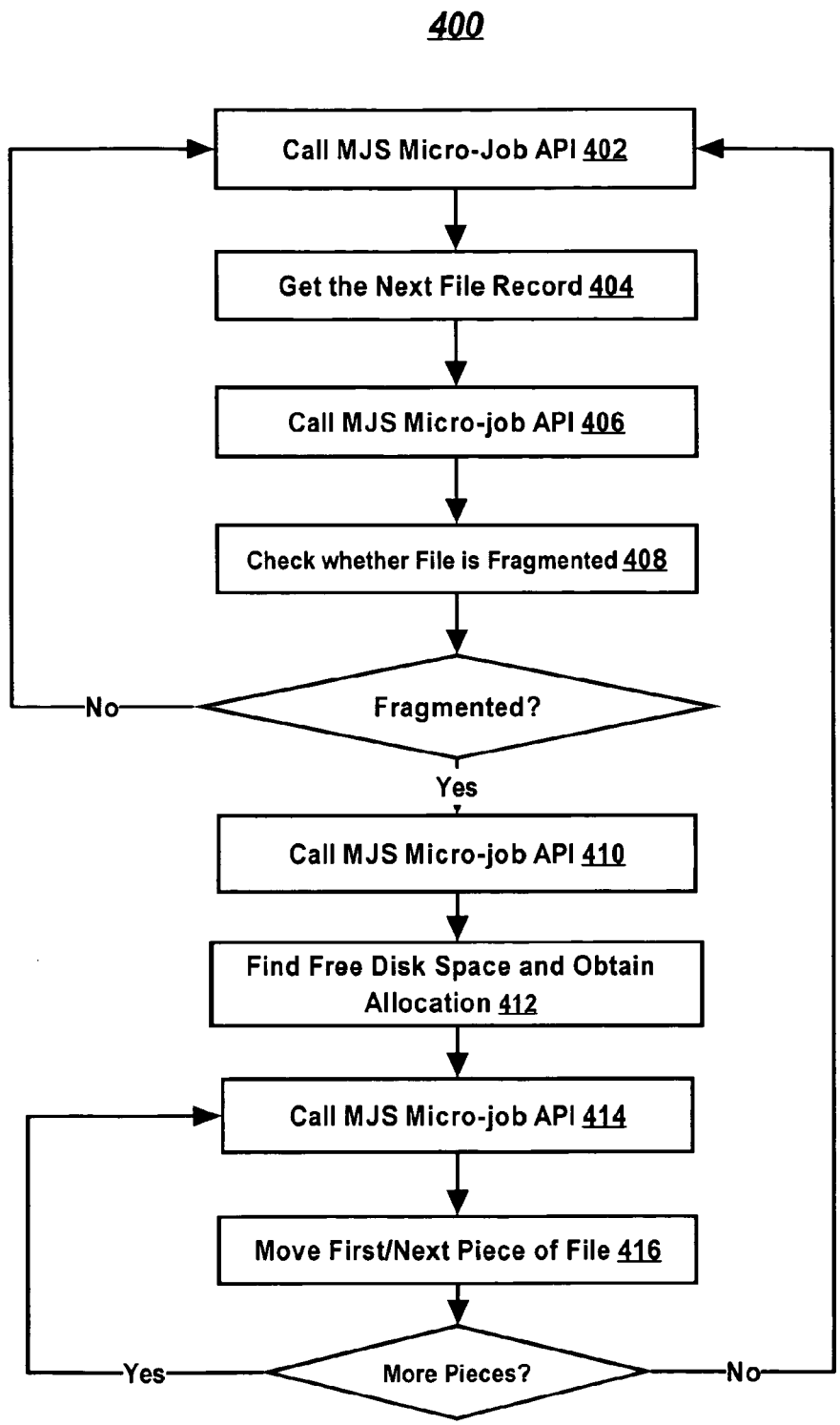
FIG. 4 illustrates steps of a process of defragmenting a storage medium using micro-jobs, in accordance with an embodiment of the present invention.

The MJS-enabled application is a defragmenter, in accordance with one embodiment. FIG. 4 illustrates steps of a process 400 of an MJS defragmenter using micro-jobs, in accordance with an embodiment of the present invention. Process 400 is an example of one way in which at least a portion of a defragmenter can make use of the micro-job concepts. In this example, the MJS-enabled application interfaces with the MJS via an API. However, as previously mentioned, the MJS may be integrated into the MJS-enabled application, wherein the API is not necessary.

The process of defragmenting includes scanning a disk drive for fragmented files. The scanning can be broken down into separate micro-jobs of getting a file record and determining whether the file is fragmented. Scanning the disk drive is depicted in steps 402-408 of FIG. 4.

In step 402, the MJS-enabled defragmenter calls the micro-job API to request permission from the MJS to execute a micro-job. The API call can specify resource utilization threshold parameters for this micro-job. Alternatively, previously defined parameters can be applied for this micro-job. In response to receiving the request, the MJS determines when the micro-job can be executed. This determination can be based on the resource utilization threshold parameters.

In step 404, after the MJS-enabled application receives permission, the MJS defragmenter executes a micro-job, which in this case is to get the next file record. In step 406, the MJS-enabled application again calls the micro-job API. When the MJS-enabled application receives permission to execute from the MJS, the MJS-enabled application determines whether the file from step 404 is fragmented. If the file is not fragmented, process 400 returns to step 402.

If the file is fragmented, the MJS-enabled defragmenter can defragment the file, as depicted in steps 410-416. Step 410 is a call to the micro-job API. Step 412 is to find free disk space for the file and obtain an allocation of the free space.

Step 414 of calling the micro-job API and step 416 of moving a piece of the file are repeated until the entire file is moved. For example, the file to be moved could be moved in pieces small enough to cause no significant impact on the performance of other applications.

Thus, the micro-job concept provides for a dynamic defragmenter that monitors fragmentation on an on-going basis and defragments files as soon as fragmentation occurs. This results in an MJS-enabled defragmenter that defragments fragmented files immediately upon the occurrence of fragmentation, without waiting for a scheduled defragmentation run time. Thus, an MJS-enabled defragmenter is a real-time defragmenter, in accordance with an embodiment of the present invention.

Shell Micro-Job Scheduler

In one embodiment, the MJS automatically divides a computing job into micro-jobs. For example, the MJS works as a shell wrapped around application programs that are not MJS-enabled. Thus, the shell MJS is a complete software application through which any executable can be run. The shell MJS automatically divides the computing job from the executable into micro-jobs. In other words, the application programmer does not need to divides the application into micro-jobs, in this embodiment.

The shell MJS divides the computing job from the executable into micro-jobs based on resource utilization, in one embodiment. The shell MJS may analyze the application and how the application runs to see what resources the application uses. For example, the MJS analyzes what resources the application uses and to what degree the application uses the resources. For example, when a disk defragmenter runs, the shell MJS can determine what resources the applications use (e.g., CPU, network, disk I/O). The shell MJS automatically determines how to divide the application in into micro-jobs based on this analysis, in one embodiment. The shell MJS may also determine how to schedule the micro-jobs, based on this analysis.

The shell MJS may use various parameters to determine how to divide the computing job into micro-jobs and/or determine how to schedule the micro-jobs for execution. These parameters may be based on user input or established by the shell MJS. For example, the user may specify that a particular application has a high priority.

Hardware Overview

Figure 5:
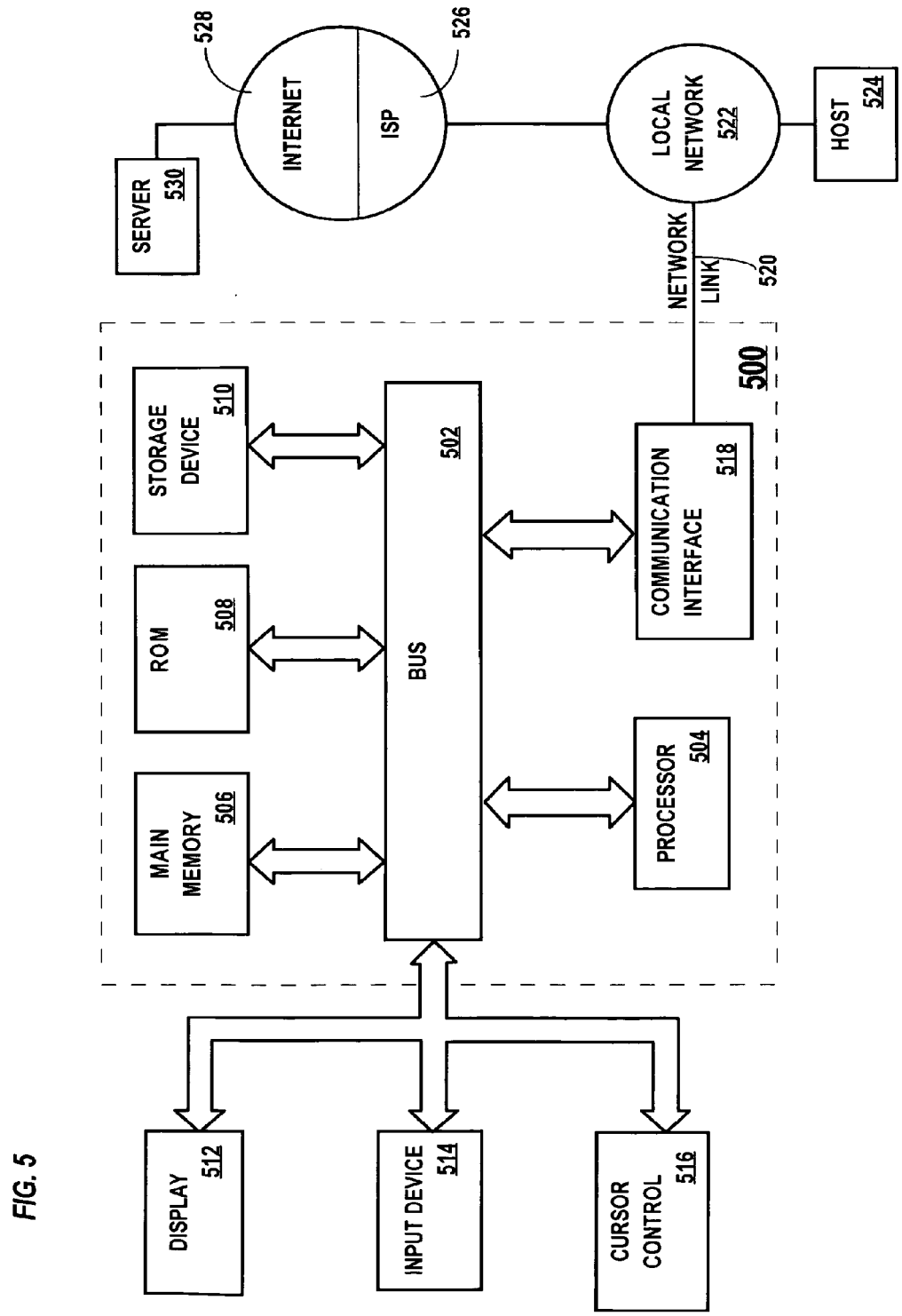
FIG. 5 is a block diagram that illustrates a computer system upon which an embodiment of the invention may be implemented.

FIG. 5 is a block diagram that illustrates a computer system 500 upon which an embodiment of the invention may be implemented. Steps of process 300 and process 400 are stored as instructions one or more of the computer-readable media of system 500 and executed on the processor of computer system 500. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions. The computer system 500 can have any number of processors 504. For example, computer system 500 is a multi-processor system, in one embodiment. The processor 504 can have any number of cores. In one embodiment, the processor 504 is a multi-core processor 504. Computer system 500 can be used in a hyper threaded machine.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer readable medium comprising instructions which, when executed by one or more hardware processors, causes performance of operations comprising:
   dividing a computer job into a plurality of micro-jobs;
   queuing each of the plurality of micro-jobs into one of a group of queues, the group of queues comprising:
      (a) a first queue of a first set of micro-jobs requiring a first resource without requiring a second resource;
      (b) a second queue of a second set of micro-jobs requiring the second resource without requiring the first resource;
      (c) a third queue of a third set of micro-jobs requiring both the first resource and the second resource;
   executing one or more micro-jobs from the first set of micro-jobs responsive to determining that utilization of the first resource is below a first threshold value;
   executing one or more micro-jobs from the second set of micro-jobs responsive to determining that utilization of the second resource is below a second threshold value;
   executing one or more micro-jobs from the third set of micro-jobs responsive to determining that both utilization of the first resource is below the first threshold value and utilization of the second resource is below the second threshold value.

2. The medium of claim 1, wherein the first resource is a Central Processing Unit (CPU) and the second resource is a network.

3. The medium of claim 1, wherein first resource is used for disk I/O and the second resource is a network.

4. The medium of claim 1, wherein the one or more micro-jobs from the first set of micro-jobs is executed even when utilization of the second resource is not below the second threshold value.

5. The medium of claim 1, wherein the one or more micro-jobs from the first set of micro-jobs is executed regardless of the utilization of the second resource.

6. The medium of claim 1, wherein the first threshold value is different than the second threshold value.

7. A method comprising:
   dividing a computer job into a plurality of micro-jobs;
   queuing each of the plurality of micro-jobs into one of a group of queues, the group of queues comprising:
      (a) a first queue of a first set of micro-jobs requiring a first resource without requiring a second resource;
      (b) a second queue of a second set of micro-jobs requiring the second resource without requiring the first resource;
      (c) a third queue of a third set of micro-jobs requiring both the first resource and the second resource;
   executing one or more micro-jobs from the first set of micro-jobs responsive to determining that utilization of the first resource is below a first threshold value;
   executing one or more micro-jobs from the second set of micro-jobs responsive to determining that utilization of the second resource is below a second threshold value;
   executing one or more micro-jobs from the third set of micro-jobs responsive to determining that both utilization of the first resource is below the first threshold value and utilization of the second resource is below the second threshold value;
   wherein the method is executed by at least one device including a hardware processor.

8. The method of claim 7, wherein the first resource is a Central Processing Unit (CPU) and the second resource is a network.

9. The method of claim 7, wherein first resource is used for disk I/O and the second resource is a network.

10. The method of claim 7, wherein the one or more micro-jobs from the first set of micro-jobs is executed even when utilization of the second resource is not below the second threshold value.

11. The method of claim 7, wherein the one or more micro-jobs from the first set of micro-jobs is executed regardless of the utilization of the second resource.

12. The method of claim 7, wherein the first threshold value is different than the second threshold value.

13. A system comprising:
   at least one device including a hardware processor;
   the system being configured to perform operations comprising:
   dividing a computer job into a plurality of micro-jobs;
   queuing each of the plurality of micro-jobs into one of a group of queues, the group of queues comprising:
      (a) a first queue of a first set of micro-jobs requiring a first resource without requiring a second resource;
      (b) a second queue of a second set of micro-jobs requiring the second resource without requiring the first resource;

(c) a third queue of a third set of micro-jobs requiring both the first resource and the second resource;
executing one or more micro-jobs from the first set of micro-jobs responsive to determining that utilization of the first resource is below a first threshold value;
executing one or more micro-jobs from the second set of micro-jobs responsive to determining that utilization of the second resource is below a second threshold value;
executing one or more micro-jobs from the third set of micro-jobs responsive to determining that both utilization of the first resource is below the first threshold value and utilization of the second resource is below the second threshold value.

14. The system of claim 13, wherein the first resource is a Central Processing Unit (CPU) and the second resource is a network.

15. The system of claim 13, wherein first resource is used for disk I/O and the second resource is a network.

16. The system of claim 13, wherein the one or more micro-jobs from the first set of micro-jobs is executed even when utilization of the second resource is not below the second threshold value.

17. The system of claim 13, wherein the one or more micro-jobs from the first set of micro-jobs is executed regardless of the utilization of the second resource.

18. The system of claim 13, wherein the first threshold value is different than the second threshold value.

* * * * *